No. 741,435. PATENTED OCT. 13, 1903.
W. W. ANNABLE.
PNEUMATIC CONVEYER.
APPLICATION FILED JAN. 19, 1903.
NO MODEL. 2 SHEETS—SHEET 1.
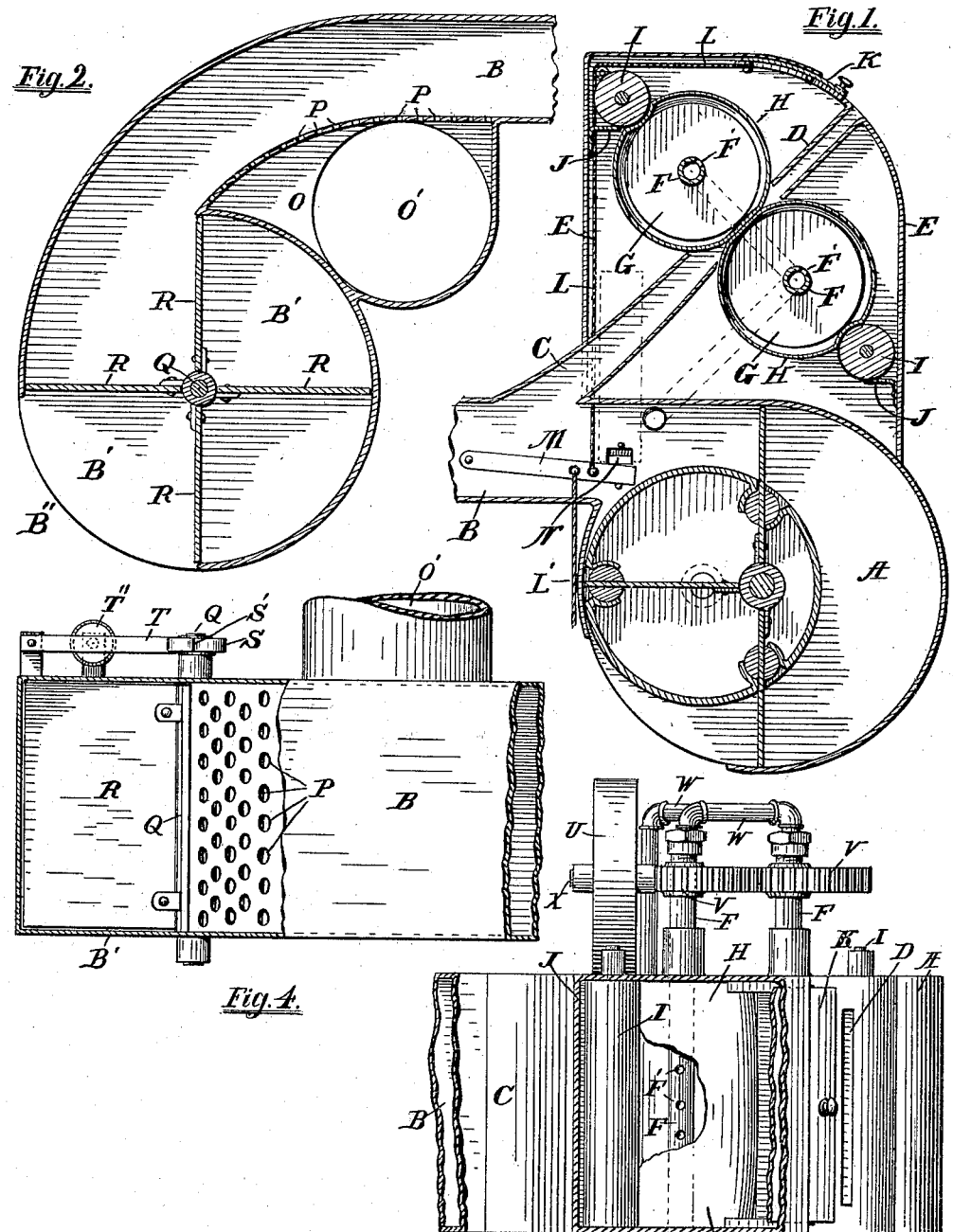
Witnesses
Georgiana Chace
Palmer A. Jones
Inventor
Warren W. Annable
By Luther V. Moulton
Attorney No. 741,435. PATENTED OCT. 13, 1903.
W. W. ANNABLE.
PNEUMATIC CONVEYER.
APPLICATION FILED JAN. 19, 1903.
NO MODEL. 2 SHEETS—SHEET 2.
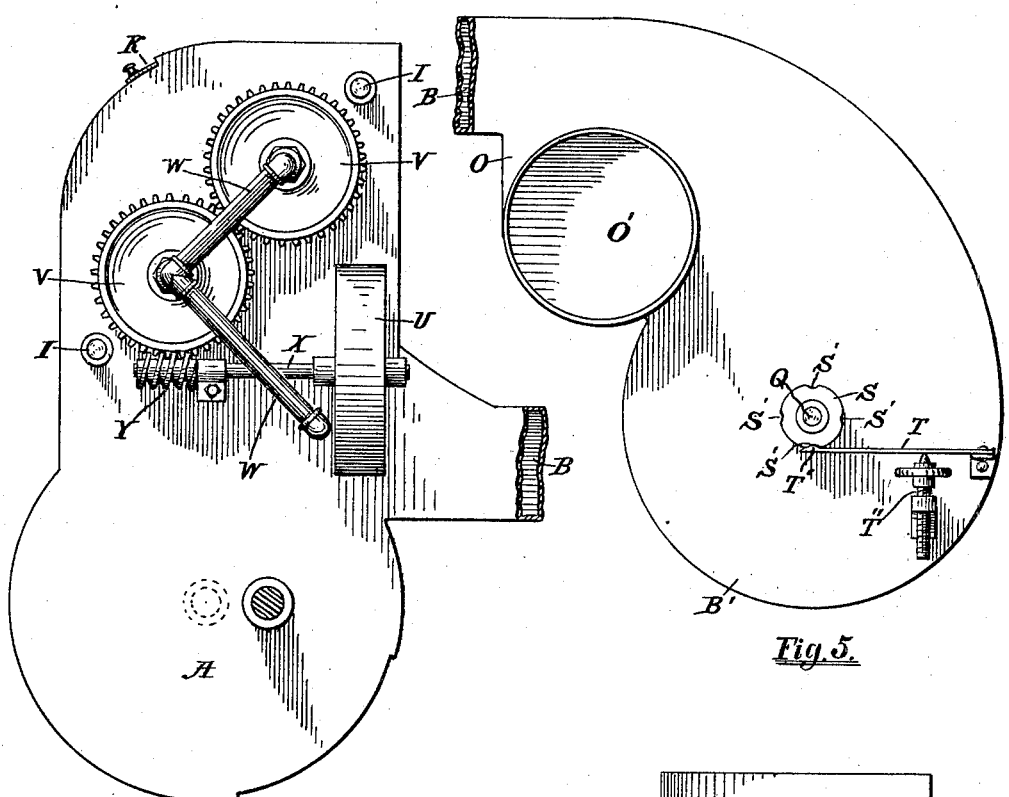
Fig. 5.
Fig. 6.
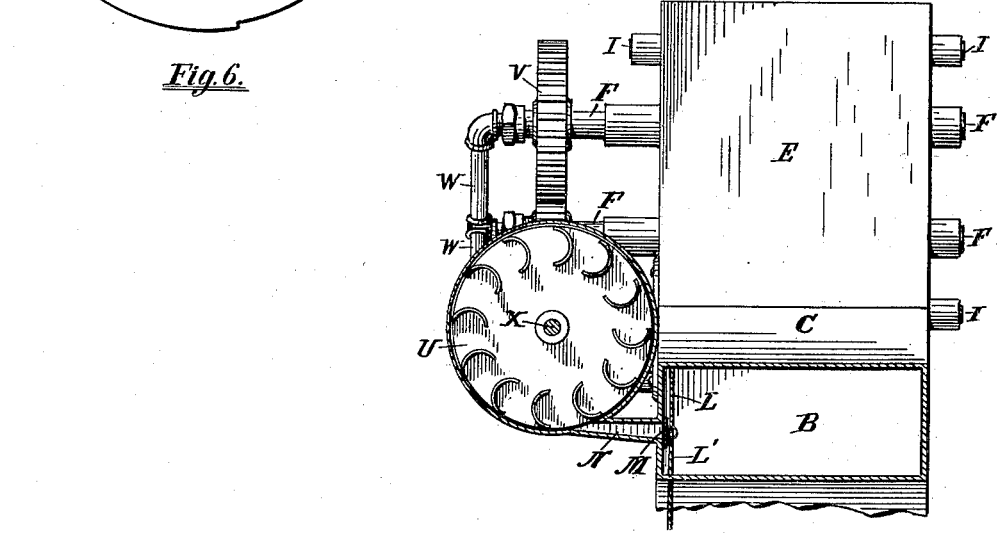
Fig. 7.
Witnesses
Georgiana Chace
Palmer A. Jones.
Inventor
Warren W. Annable
By Luther V. Moulton
Attorney No. 741,435. Patented October 13, 1903.

UNITED STATES PATENT OFFICE.

WARREN W. ANNABLE, OF GRAND RAPIDS, MICHIGAN, ASSIGNOR TO THE APPLIANCE COMPANY, LIMITED, OF GRAND RAPIDS, MICHIGAN, A CORPORATION OF MICHIGAN.

PNEUMATIC CONVEYER.

SPECIFICATION forming part of Letters Patent No. 741,435, dated October 13, 1903.

Application filed January 19, 1903. Serial No. 139,570. (No model.)

*To all whom it may concern:*

Be it known that I, WARREN W. ANNABLE, a citizen of the United States, residing at Grand Rapids, in the county of Kent and State of Michigan, have invented certain new and useful Improvements in Pneumatic Conveyers; and I do hereby declare the following to be a full, clear, and exact description of the invention, such as will enable others skilled in the art to which it appertains to make and use the same.

My invention relates to improvements in pneumatic conveyers, and more especially to such conveyers for the transmission of letters or other light mail-matter and similar articles; and its object is to provide means for inserting the articles to be conveyed into the air tube or conduit and discharging the same from the said tube without allowing the air to escape and to provide the device with certain new and useful features, hereinafter more fully described, and particularly pointed out in the claims.

My device consists, essentially, of a suitable tube or conduit through which an air-blast is forced by means of a suitable blower and one or more lateral inlets to receive the matter to be transmitted and provided with yielding or elastic closures to prevent the escape of air and to permit the insertion of the articles to be conveyed, said closures being preferably elastic rolls and means for rotating said rolls to insert the said material, together with an exit-terminal provided with an air-vent and lateral openings to permit the air to escape inward toward the axis of a curved portion of the conduit and movable terminal plates to close the same and to receive the matter conveyed and automatically discharge the same at intervals, as will more fully appear by reference to the accompanying drawings, in which—

Figure 1 is a longitudinal vertical section of the receiving portion and blower of a device embodying my invention; Fig. 2, the same of the discharging portion of my device; Fig. 3, a plan view of Fig. 1 with portions broken away to show the construction; Fig. 4, the same of Fig. 2; Fig. 5, a side elevation of the discharge end of the device; Fig. 6, the same of the receiving end of the device; and Fig. 7 an elevation of the parts shown in Fig. 6 looking toward the right-hand side of the same and with parts broken away to show the construction.

Like letters refer to like parts in all of the figures.

A represents any suitable blower for producing a current of air through the conduit B. Said blower may be located at any convenient point and driven in any convenient manner. I prefer to use a positive pressure-blower, so that in the event that the conduit should become clogged the positive action of the blower will tend to force the contents through the conduit.

The conduit B is extended to any convenient point for discharging the matter conveyed therethrough. To insert the material to be conveyed, I prefer to use a lateral branch C, extending at an acute angle from the conduit or pipe B and with its lower end opening in the direction of the air-current, as shown in Fig. 1. To prevent the escape of air therethrough, I prefer to inclose the upper end of this branch pipe C in a suitable casing E and provide an elastic closure for the same, consisting of a pair of elastic rolls. These I prefer to construct of rubber tubes H, attached at each end to heads G, mounted on hollow shafts F, provided with lateral openings F' to admit air to the interior of these tubes and inflate the same, for which purpose I connect the shafts F with the conduit B by means of suitable pipes W, whereby the air in the conduit B is free to flow into these rolls and inflate the same. These rolls are arranged with their axes in a plane substantially at right angles to the branch C and with their adjacent sides in close contact and opposite the opening of said branch. To prevent the air escaping between these rolls and the case, I provide idler-rolls I, engaging the rolls H at one side and located near the opposite sides of the case. To prevent the air from passing these idler-rolls at the sides next the case, I provide stops J, consisting of strips of flexible material, attached at one edge to the case and engaging the rolls I at the other edge. These four rolls constitute a series of rolls in contact with each other and extending diagonally from side to side within the case. At the side of the rolls opposite the branch pipe C and in line with said branch pipe is a flat spout D, extending transversely of the case and opening through the side of the same to receive the material to be conveyed and conduct the same between the rolls H. This spout D is preferably made of such dimensions that it will only receive letters, circulars, and other thin packages of such proportions and weight as will be carried along by the air-current. The front upper corner of the case E is preferably rounded, as shown, and the opening of the spout D is closed by a slide K when not in use.

The rolls H may be rotated in any convenient manner, as by a crank attached thereto; but I prefer to automatically rotate the same by means of the gearing V, connecting the rolls, and driven by a small air-motor U, having a shaft X, provided with a worm Y, engaging one of said gears, said motor being driven by an air-blast through a suitable pipe N, extending from the conduit B to the periphery of the case of the motor, as shown in Fig. 7. I prefer to automatically open and close this pipe N by means of a movable gate M, which covers and uncovers the inner opening of the pipe simultaneously with the movement of the slide K. To move this gate, I attach a cord E to the same and extend the cord upward and over a suitable pulley and forward to the slide K, to which said cord is attached. Thus when the slide is drawn down over the opening of the spout D the gate M is closed and the air cut off from the motor. To conveniently open this gate and the slide K, I prefer to attach a cord L' to the gate and extend the same downward to any convenient lever or treadle, (not shown,) whereby by placing the foot upon the same the operator may open both the gate M and the slide K. Thus the motor will be automatically started and stopped as the slide K is opened and closed.

The discharge end of the conduit B is curved downward and terminates in a cylindrical case B', having its axis transverse to the conduit, into which case the conduit B opens tangentially. In the angle between this case and the conduit is a chamber O, to which is connected an escape-pipe O' to receive and convey away the air passing through the conduit B. To permit this air to escape downward and inward toward the axis of the curved portion of the conduit, I provide the under side of the conduit with numerous small openings P, which prevent the escape of the conveyed material and allow the air to escape. By placing these openings for the air downward and inward in this way the inertia of the conveyed material carries it clear of the openings and against the closed outer and downwardly-inclined side of the conduit. At the same time the backward movement of the air tends to check the headway of said material. I thus also avoid holding the material against this outer side of the conduit, as would be the case if the air escaped therethrough.

In the axis of the case B' is a rotative shaft Q, on which are radial plates or wings R, which serve to close the outer end of the conduit and to receive the conveyed material. To properly locate and hold these plates, I provide a wheel S on the outer end of the shaft, having a corresponding number of inclined recesses S' therein, which recesses are successively engaged by a spring-stop T, having a suitable inclined projection T' thereon to enter said recesses and hold the shaft Q from turning until sufficient material is accumulated on one of the plates R to overcome the resistance of the stop and turn the wheel to the next recess. This movement brings the next plate R in proper position and discharges the material on the preceding plate through a suitable opening B'' in the case B'.

T'' is an adjusting-screw for the stop T, whereby the tension on the same is adjusted to properly hold the shaft Q from turning under the pressure of the air-blast in the conduit B and to permit the same to turn when one of the plates R becomes loaded with the conveyed material.

The operation of my device is as follows: When the letters or other suitable material are inserted in the spout B, the same will pass down between the rolls H, which rolls will yield sufficiently to permit the same to pass without permitting any air to escape, and after passing between the rolls said material will slide down the branch C and be caught in the air-current in the conduit B and carried to the exit-opening B'' and there deposited on the plate R. Any convenient number of these inlet branches C and coacting parts can be provided along the line of the conduit B, as occasion may require.

Having thus fully described my invention, what I claim, and desire to secure by Letters Patent, is—

1. The combination of a conduit, a blower, a branch pipe opening into the conduit, a pair of elastic rolls engaging each other opposite the end of the pipe, and means for rotating the rolls.

2. The combination of a conduit, a blower, a branch pipe opening into the conduit, a pair of hollow elastic rolls engaging each other opposite the end of the branch pipe, pipes to admit the air to the rolls, and means for rotating the rolls.

3. The combination of a conduit, a blower, a branch pipe opening into the conduit, a casing inclosing the open end of the pipe, elastic rolls in the casing and contacting each other opposite the end of the pipe, a spout in the casing at the side of the rolls opposite the branch pipe and means for rotating the rolls.

4. The combination of a conduit, a blower, a branch pipe opening into the conduit, a casing inclosing the pipe, elastic rolls in the casing and engaging each other opposite the end of the pipe, idlers engaging the elastic rolls, flexible stops attached to the case and engaging the idlers, and means for rotating the rolls.

5. The combination of a conduit, a blower, a branch pipe opening into the conduit, a casing inclosing the end of the pipe, hollow elastic rolls contacting each other opposite the end of the pipe, pipes connecting the interior of the rolls and conduit, a spout in the casing opposite the branch pipe and in line therewith, and means for rotating the rolls.

6. The combination of a conduit, a blower, a branch pipe opening into the conduit, hollow elastic rolls opposite the end of the branch pipe and engaging each other, tubular shafts in the axis of the rolls and having lateral openings, pipes connecting the shafts and conduit, and means for rotating the rolls.

7. The combination of a conduit, a blower, a branch pipe opening into the conduit, hollow elastic rolls engaging each other opposite the end of the branch pipe, tubular shafts to the rolls and having lateral openings, pipes connecting the shafts and the conduit, a casing inclosing the rolls, a spout in the casing opposite the branch pipe, and means for rotating the rolls.

8. The combination of a conduit, a blower, a branch pipe opening into the conduit, hollow elastic rolls engaging each other opposite the opening of the pipe, tubular shafts supporting the rolls and having lateral openings means for supplying air to the shafts and rolls, means for rotating the rolls, idlers engaging the rolls, a casing inclosing the rolls and idlers, and a spout in the casing at the side of the rolls opposite the branch pipe.

9. The combination of a conduit, a blower, a branch pipe opening into the conduit, elastic rolls engaging each other opposite the end of the pipe, an air-motor connected to the rolls, a gate to admit air from the conduit to the motor, and means for opening and closing the gate.

10. The combination of a conduit, a blower, a branch pipe opening into the conduit, elastic rolls engaging each other opposite the end of the pipe, an air-motor to rotate the rolls, a spout opposite the branch pipe, a slide to close the spout, a gate to admit air to the motor, and means for simultaneously moving the slide and gate.

11. The combination of a conduit, a blower, a branch pipe opening into the conduit, hollow elastic rolls opposite the end of the pipe, means for supplying air to the rolls an air-motor connected to the rolls, a movable gate to admit air to the motor, a casing inclosing the rolls and pipe, a spout in the casing, a slide to close the spout, a cord connecting the slide and gate, and means for opening the gate and slide.

12. The combination of a conduit, a blower, a branch pipe to the conduit, hollow elastic rolls to close the branch pipe, an air-motor connected to the rolls to rotate the same, a pipe connecting the air-motor to the conduit pipes connecting the rolls to the conduit, a casing inclosing the rolls and pipe, a spout in the casing, a slide to close the spout, a gate to close the opening to the air-motor, and means for simultaneously opening and closing the gate and slide.

13. The combination of a conduit having a downwardly-curved end, a blower, means for inserting the material into the conduit, air-exit openings in the under side of the curved portion of the conduit, and a movable plate to close the end of the conduit, and to receive and discharge the material.

14. The combination of a conduit having a downwardly-curved discharge end, a blower, means for inserting material into the conduit, air-exit openings in the lower side of the curved end of the conduit, a chamber and a pipe to receive the air, and a movable plate to close the end of the conduit, and to receive and discharge the material.

15. The combination of a conduit having a downwardly-curved end and lateral air-exit openings, a cylindrical casing arranged transversely and tangential to the end of said conduit, a shaft in the axis of said casing, radial plates on said shaft, and a yielding stop to control the rotation of said shaft.

16. The combination of a conduit having a downwardly-curved discharge end, and air-exit openings in its under side, a chamber and discharge-pipe to receive the air, a cylindrical casing tangential to the exit end of the pipe, a rotative shaft in the axis of the casing, radial plates mounted on the shaft, and a yielding stop to control the rotation of the shaft.

17. The combination of a conduit having a downwardly-curved discharge end and air-exit openings in the under side of the curved end, a casing tangential to the discharge end of the pipe and having its axis transverse thereto, a rotative shaft in the axis of the casing, radial plates mounted on the shaft, a wheel on the shaft having recesses, and a yielding stop successively engaging the recesses in the wheel.

18. The combination of a conduit, a blower, a branch spout to the conduit, an elastic closure to the spout, a downwardly-curved end to the conduit, having air-exit openings in its under side, and a movable plate to close the end of the conduit, and to receive and discharge the material therefrom.

19. The combination of a conduit, a blower, a branch pipe to the conduit, elastic rolls engaging each other opposite the end of the branch pipe, means for rotating the rolls, a downwardly-curved discharge end to the conduit, having air-exit openings in its under side, a transverse casing tangential to the discharge end of the conduit, a shaft in the axis of said casing radial plates mounted on the shaft, and a yielding stop to control the rotation of the shaft.

20. The combination of a conduit, a blower, a branch pipe to the conduit, hollow elastic rolls engaging each other opposite the end of the pipe, an air-motor to rotate the rolls, pipes connecting the rolls with the conduit, a pipe connecting the motor with the conduit, a downwardly-curved discharge end to the conduit and having air-exit openings in its under side, a cylindrical casing tangential and transverse to the discharge end of the conduit, a rotative shaft in the axis of said casing, radial plates on the shaft, a wheel on the shaft having recesses, and a yielding stop engaging the recesses.

21. The combination of a conduit, a blower, a branch pipe, elastic rolls engaging each other opposite the end of the pipe, an air-motor connected to the rolls, a gate to admit air to the motor, a case inclosing the pipe and rolls, a spout at the side of the rolls opposite the pipe, a slide to close the spout, means for simultaneously moving the gate and slide, a downwardly-curved discharge end to the conduit having air-exit openings in its under side, a cylindrical casing tangential and transverse to the said end, a rotative shaft in the axis of the casing, radial plates on the shaft, a wheel on the shaft having recesses corresponding to the plates, and a spring having an inclined projection successively engaging the recesses.

In testimony whereof I affix my signature in presence of two witnesses.

WARREN W. ANNABLE.

Witnesses:
LUTHER V. MOULTON,
GEORGIANA CHACE.